United States Patent Office 2,764,174
Patented Sept. 25, 1956

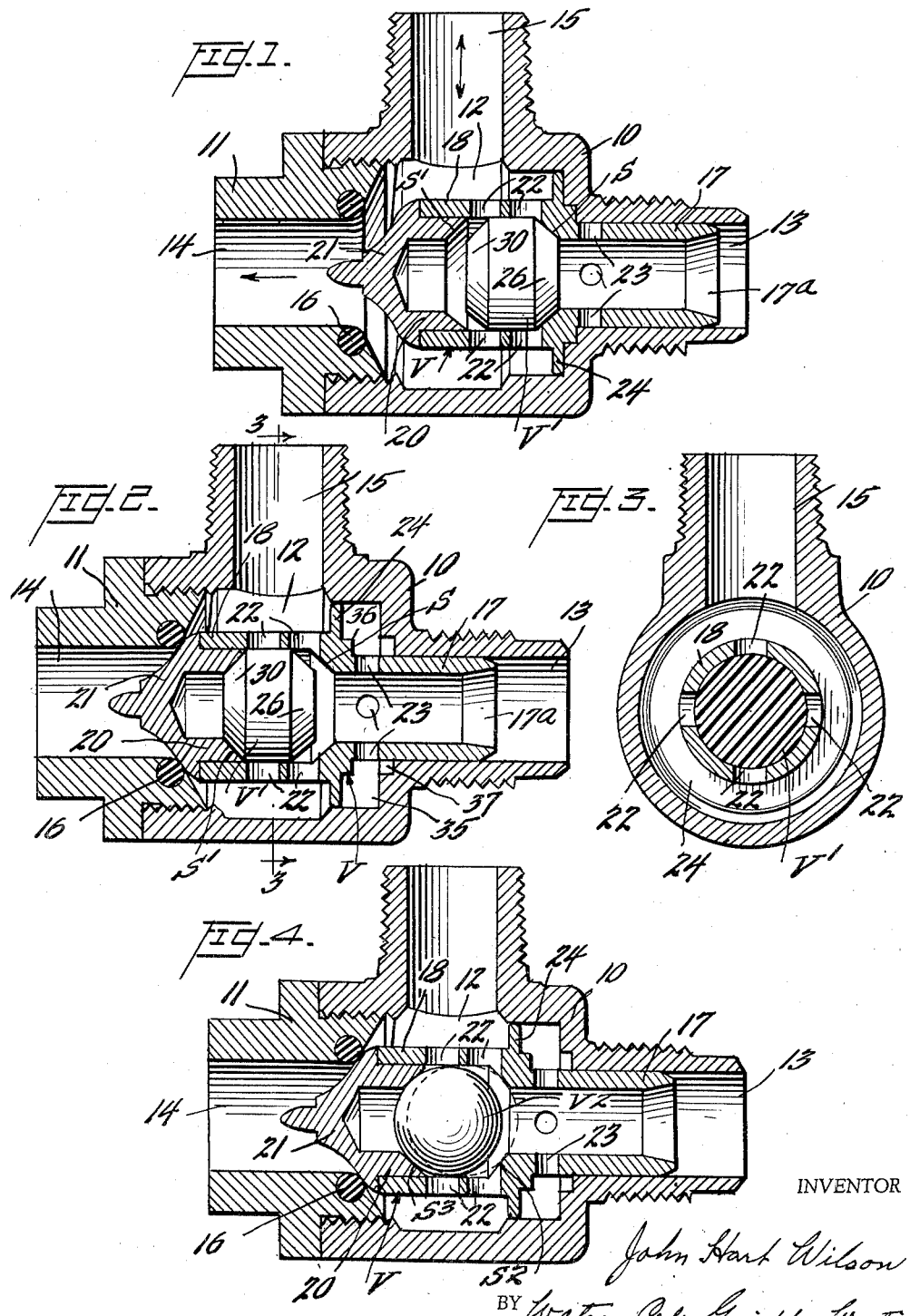

2,764,174

QUICK RELEASE VALVES

John Hart Wilson, Wichita Falls, Tex.

Application January 15, 1952, Serial No. 266,473

4 Claims. (Cl. 137—102)

This invention relates to valves and particularly to release valves designed and intended for use in association with pneumatically operated brakes, clutches or other devices, and intended to function automatically to effect the almost instantaneous release of the compressed air in the brake, clutch or device actuating cylinder when it is desired to release the brake, actuate the clutch or effect the movement of some other member.

Numerous types of machines now and heretofore in use are provided with actuating or control means of pneumatic type, the employment of such means enabling an operator stationed at a point which may be remote from the machine being operated, or at least not immediately adjacent such machine, to control its operation by manipulating clutches or brakes with the aid of fluid under pressure, generally air. It has been suggested that there may be used with advantage in the operation of a machine of the type above briefly referred to, a valve means positioned immediately adjacent the brake or clutch actuating cylinder and the function of which is to serve to quickly and automatically vent the compressed air in the cylinder directly into the surrounding atmosphere when it is desired to actuate or de-actuate the clutch, brake or like instrumentality. Devices to accomplish this purpose have been heretofore designed, suggested and used with advantage, eliminating the considerable delay in de-energization of the power cylinder which would otherwise naturally occur in the event that such cylinder could only be evacuated by passage of the substantial body of compressed air therein back through the relatively long supply line to a discharge valve at the end of that line.

The purpose of the present invention is to provide an improved automatically functioning release valve of simpler and more rugged construction than any heretofore known or used, more reliable in its operation, and more able to continue to function over long periods of time without attention than prior valves of this general character, in which the number of working parts is reduced to a minimum and which includes no spring or other resilient device as an essential operating element.

Two embodiments of the invention have been selected for disclosure by way of example, and these will be described in detail. They are illustrated in the accompanying drawings, in which, Figure 1 is a vertical section through the casing of the valve to be first described and through the primary valve member, this being shown in unseated position, which position it occupies during discharge of compressed air directly into the atmosphere through the exhaust port;

Figure 2 is a similar view showing the primary valve in exhaust port closing position;

Figure 3 is a section on line 3—3 of Figure 2; and

Figure 4 is a view similar to Figure 2, showing a somewhat modified form of valve member.

The valve structure shown in Figures 1, 2 and 3 includes a two-part casing, the main member of the casing being indicated at 10 and the minor member or closure cap being indicated at 11, these members being generally cylindrical in transverse section and the cap being threaded into the casing as shown. This casing defines a central valve chamber 12, and opposed or aligned supply and exhaust ports 13 and 14, respectively, and an intermediate port 15, are formed in its walls, port 15 being intended to function as an offtake channel for air under pressure passing through the valve casing toward some fluid pressure actuated instrumentality, as well as a return port or duct for the same air as it flows from the air pressure chamber of such instrumentality toward the discharge port 14. Other arrangements of ports may be devised but that which is illustrated is eminently satisfactory and permits the utilization of a valve unit of simple form and structure and which may be supported for movement in a novel and improved manner.

This valve unit comprises a primary valve of piston-like nature, and a secondary valve which is associated with and carried by the primary valve. The primary piston valve is in the form of a tube, one end of which is closed and which changes diameter at about its midpoint, that portion thereof which lies wholly within the valve chamber 12 being somewhat larger in diameter than the cylindrical portion which, as shown in Figures 1 and 2, is disposed either wholly or in large part within the supply port 13, with the wall of which it makes a sliding fit. The closure for that end of the valve nearest the exhaust port 14 has a generally conical face, an annular portion of which is adapted to seat upon a valve seat which comprises the annular ring 16, preferably of an elastic material such as natural or synthetic rubber, and which is generally known as an O-ring. This O-ring is retained in an annular seat of circular cross section which is provided for its reception and is secured firmly in the position shown, during the manufacture of the cap 11, by upsetting, swaging or crimping a portion of the immediately adjacent metal of the cap, which metal is sufficiently ductile to permit such swaging operation, into ring retaining position, as shown.

The primary valve is indicated generally at V and the tubular portion 17 thereof, which is of reduced outside diameter, makes a sliding fit with the cylindrical wall of the supply port 13, that portion of the valve casing in which the cylindrical supply port 13 is formed comprising the sole guide and support for the primary valve in its movements. That portion 18 of the valve V which is of somewhat larger diameter than portion 17 is, like portion 17, tubular in form, and the member which comprises the two coaxial portions 17 and 18 provides a passage through the major portion of the valve, from its open end 17a. At its opposite end the passage in the tubular valve V is closed by a plug or end member 21 having a skirt 20 which is forced into the position in which it is shown and is frictionally held in that position. The wall of portion 18 of the tubular valve V, which is always disposed within the valve chamber 12, has formed therein four pairs of ports or apertures 22, and the portion 17 of the primary valve V has four apertures 23, the apertures 22 and 23 being preferably in the form of radially drilled cylindrical holes. Integral with or rigidly affixed to the valve portion 18 of larger cross section is an annular flange 24 the peripheral edge of which slidably engages the encircling cylindrical surface of the valve chamber.

Intermediate its ends the passage through valve V is provided with a conical seat S, facing away from the supply port 13, and a valve V', hereinafter designated the secondary valve, is provided with a conical surface 26 which seats closely upon the seat S when it is in the position in which it is shown in Figure 1. That portion of the cylindrical passageway through the valve V which lies intermediate the seat S and the similar surface S' of the inner end of the skirt 20 of member 21, comprises a cage in which the valve V' is loosely confined, this secondary valve being reciprocable longitudinally of the primary valve through the limited distance determined by seats S and S'. As shown in Figures 1, 2 and 3, the secondary valve V' has a cylindrical intermediate portion which slidably engages the wall of this cage, a conical surface 26 which engages the seat S, and a second conical surface 30 which is adapted to engage the conical stop surface S' of the cap 21. The secondary valve is of light construction and is preferably of a plastic material such as nylon which has extreme durability under shock. It effectively closes the passage in the primary valve when it occupies the position in which it is shown in Figure 1, against the passage of air under pressure toward the supply port 13 from the port 15 but is readily moved to the opposite end of its cage when air under superior pressure enters the supply port and valve passage from the right, to permit passage of air between valve and valve seat and thence through ports 22 into the valve chamber and thence through port 15 to the cylinder which is to receive such air.

In the normal operation of the quick release valve the operator will admit air to a line leading to the supply port 13 at a time when the primary and secondary valves occupy the positions in which they are shown in Figure 1. At such time the pressure in ports 14 and 15, and in chamber 12, will be that of the atmosphere. A slight build-up of pressure in the supply conduit will cause the valve unit, both primary and secondary valves, to move toward the valve seat 16 and this movement will be very rapid if the pressure of the incoming air is high, as it usually is, no substantial force resists the movement of the valve toward the left (Figures 1 and 2) so that the closure of the outlet port 14 of the valve will be almost instantaneously effected. The secondary valve will, of course, be moved to the left (Figure 2) and into contact with stop surface S', and air under pressure passing through the valve unit and through port 15 will quickly build up the pressure in the receiving cylinder so as to bring about actuation of the brake, clutch or other mechanical element which is to be actuated.

Air under pressure will, of course, pass through ports 23 into chamber 12 at the right end thereof (Figure 2) behind annular flange 24, and the pressure of the air against this flange balances the pressure against its opposite face, so that the pressure of the air acting against the closed end of the piston from the inside will maintain the cap portion 21 of the valve in tight sealing contact with the O-ring 16. This condition will continue to exist unless and until the operator vents the distant supply line control valve (not illustrated) to the atmosphere. When this occurs the pressure in the supply line leading to the supply port 13 will, of course, drop drastically, with corresponding lowering of the pressure of the air acting upon the righthand face (Figures 1 and 2) of the flange 24 and initiation of rapid flow of air from the duct 15 through the passage between secondary valve V' and seat S and toward the supply line through port 13. The rapid flow of air through the annular passage between valve V' and seat S will cause the pressure existing in this annular channel between valve and valve seat to almost instantly become lower than the static pressure of the air acting against the conical face 30 at the opposite end of the secondary valve and in the space within the cap 21 to the left (Figures 1 and 2) of that valve.

As the secondary valve is extremely light and slides freely in its cage it is caused to move toward the right under the influence of the unbalanced pressures acting upon its ends and, after having once started, will very quickly seat itself on the seat S, thus completely interrupting further flow from port 15 through the passage in valve V and toward the supply port 13. As soon as such flow is thus interrupted the valve V will be subject to an unbalanced force acting to move it toward the right, the relatively heavy pressure still existing in port 15, acting on the left face of flange 24, and which is not balanced by any pressure acting on this flange in the opposite direction, will cause the valve unit in its entirety to move quickly to the position in which it is shown in Figure 1, opening the discharge port 14 and allowing the air under pressure passing from port 15 into the valve chamber to flow quickly out through port 14 into the atmosphere. The generally conical outer surface of closure member 21 and the almost complete withdrawal of this member from port 14, facilitates this flow.

The operation defined is not only extremely rapid but is accomplished without impingement of the primary valve upon the casing in such a manner that the metal of the casing is upset or distorted under impact, which happens frequently with quick release valves of types heretofore known. Such upsetting eventually causes sticking of the movable elements of such devices, which thus cease to function. When the valve V described reaches the limit of its travel toward the right (Figure 1) it comes to rest rather gently, the surface of contact between valve and casing being relatively large. The movement of the valve is further cushioned by the temporary trapping of air within the space 35 between the flange 24 and the righthand portion of the casing 10 when the small shoulder 36 on the valve body enters the correspondingly shaped recess 37 in the housing. This provides further assurance that the main valve stem will not upset the metal of the housing when it strikes the housing at the righthand end of its travel. The unit described has the capacity to remain in operation over long periods of time with full efficiency.

The embodiment of the invention illustrated in Figure 4 is identical with that shown in Figures 1, 2 and 3 except in that the secondary or non-return valve indicated at $V^2$ is spherical instead of being cylindrical with conical ends, as in the first instance. The valve seating and movement limiting surfaces indicated at $S^2$ and $S^3$ respectively may be either conical or spherical. This form of the invention functions in the same manner as that previously described.

Having thus described the invention, what is claimed as new and desired to be secured by Letters Patent is:

1. In a quick release valve for discharging fluid under pressure, a valve body having an axial opening formed therethrough, one end of which axial opening forms an inlet port for fluid under pressure, and the other end of which is closed by an annular cap having a discharge opening formed therethrough, an enlarged chamber formed within said valve body intermediate the ends of said axial opening and in communication therewith, said valve body having a lateral opening formed therein and connecting with said enlarged chamber for passing fluid under pressure in both directions, a cylindrical shuttle valve element of two substantially different diameters mounted for sliding movement within said enlarged chamber, said shuttle valve element having an elongated chamber formed in the larger diameter portion thereof, which shuttle valve element has one closed conical end which forms a valve face at the discharge end of said shuttle valve element, an integral flange on said shuttle valve element intermediate said portions of different diameter, which flange is in sliding engagement with the wall of said enlarged chamber in said valve body, said smaller diameter portion of said shuttle valve element having a smaller axial opening formed therethrough and in communication with said elongated chamber, a secondary ball valve enclosed within said elongated chamber of said shuttle valve element, a tapered seat in said shuttle valve member adjacent the juncture of said portion of smaller diameter and the elongated chamber, said ball valve being arranged to seat against said tapered seat, said shuttle valve element having lateral openings formed through the cylindrical walls of both portions thereof, with the opening through the smaller diameter portion being in position to open into said enlarged chamber of said valve body when the discharge opening is closed by said shuttle valve, said annular cap fitted in the large diameter portion of said valve body, said cap having an O-ring mounted therein in position to receive the conical end of said shuttle valve member to close the enlarged chamber in said valve body at the discharge end thereof.

2. In a quick release valve for switching and discharging working fluid under pressure, a valve body having an axial cylindrical opening formed therethrough, one end of which axial opening forms an inlet for said valve and the other end of which forms a discharge for said valve, the intermediate portion of which axial opening is enlarged to form a cylindrical chamber, said valve body having a lateral opening formed therein in communication with said cylindrical chamber for passing of working fluid in either direction, an elongated, cylindrical shuttle valve member having a portion of large diameter and a portion of smaller diameter, an integral annular flange on said shuttle valve between said large and said small diameter portions, the flange of said shuttle valve being fitted within said cylindrical chamber in relatively close fitting relation therewith, the smaller diameter portion of said shuttle valve extending into a portion of said axial opening in relatively close fitting relation, the large diameter portion of said shuttle valve member having an enlarged longitudinal opening formed therein for a portion of the length thereof with said shuttle valve member having the end thereof adjacent the discharge opening closed by a cap of substantially conical shape, said smaller diameter portion of said shuttle valve member having a smaller longitudinal opening formed therethrough for the length thereof and in communication with said inlet opening, said longitudinal openings in said portions of said shuttle valve member being in fluid communication, said large diameter portion of said shuttle valve member having at least one lateral opening formed therein so as to interconnect said enlarged cylindrical chamber in said valve body with said enlarged longitudinal opening in said large diameter portion of said elongated shuttle valve member, said smaller diameter portion of said shuttle valve member having at least one lateral opening formed therein adjacent said annular flange, a circular valve seat formed on said elongated shuttle valve member within said enlarged longitudinal opening at the end thereof adjacent the end of said longitudinal opening within said smaller diameter portion and being intermediate said lateral openings in said shuttle valve member, a valve member fitted within said enlarged longitudinal opening in said shuttle valve member and adapted to seat on said seat therein to close communication between said lateral openings in said shuttle valve member, a valve seat formed within said valve body and surrounding said discharge port thereof, a valve face on said elongated shuttle valve member adapted to complementarily seat on said valve seat surrounding said discharge port when said shuttle valve is in one position, said valve fitted within said elongated shuttle valve member being adapted to close said axial opening in said valve body when in one position, and said shuttle valve member being adapted to close the discharge opening and to open said inlet opening when in another position.

3. The valve substantially as set forth in claim 2, wherein said valve member within said shuttle valve is a ball valve of relatively low density material.

4. The valve substantially as set forth in claim 2, wherein said valve seat which is in the valve body and surrounding said discharge opening thereof is an O-ring of elastomer material.

References Cited in the file of this patent
UNITED STATES PATENTS

| | | |
|---|---|---|
| 1,142,513 | Gase | June 8, 1915 |
| 1,891,119 | Stover | Dec. 13, 1932 |
| 2,312,686 | Campbell | Mar. 2, 1943 |
| 2,488,949 | Walsh | Nov. 22, 1949 |
| 2,706,487 | Wilson | Apr. 19, 1955 |